(12) United States Patent
Choi et al.

(10) Patent No.: US 7,732,985 B2
(45) Date of Patent: Jun. 8, 2010

(54) MICRO STAGE USING PIEZOELECTRIC ELEMENT

(75) Inventors: Sang Kuk Choi, Daejeon (KR); Dae Jun Kim, Daejeon (KR); Jin Woo Jeong, Daegu (KR); Dae Yong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 71 days.

(21) Appl. No.: 11/231,471

(22) Filed: Sep. 20, 2005

(65) Prior Publication Data

US 2006/0131996 A1 Jun. 22, 2006

(30) Foreign Application Priority Data

Dec. 16, 2004 (KR) .................. 10-2004-0107224

(51) Int. Cl.
*H01L 41/00* (2006.01)
(52) U.S. Cl. .................. 310/328; 310/311; 310/326; 310/338; 310/345; 310/348
(58) Field of Classification Search .................. 310/328
See application file for complete search history.

(56) References Cited

U.S. PATENT DOCUMENTS

| 4,516,253 A | * | 5/1985 | Novak | 378/34 |
| 4,525,852 A | * | 6/1985 | Rosenberg | 378/34 |

(Continued)

FOREIGN PATENT DOCUMENTS

| DE | 724 183 A | 8/1942 |
| DE | 761 373 A | 7/1953 |
| DE | 40 23 311 A1 | 1/1992 |
| JP | 01-210 672 A | 8/1989 |

(Continued)

OTHER PUBLICATIONS

Smith et al., New Variable Low Temperature Scanning Tunneling Microscope for Use in Ultrahigh Vacuum, Nov. 15 1994, American Institute of Physics, pp. 2499-2503.*

(Continued)

*Primary Examiner*—Jeffrey Donels
*Assistant Examiner*—Christopher Uhlir
(74) *Attorney, Agent, or Firm*—Blakely, Sokoloff, Taylor & Zafman LLP (57) ABSTRACT

Provided is a micro stage comprising: a body having a vertically perforated through-hole passing through a central portion thereof; a bobbin including a tip portion with an electron emission tip embedded in the center thereof, and passing through the through-hole of the body to be moved in the through-hole along a first axis perpendicular to a vertical direction; a first piezoelectric element disposed on the body and lengthened when a voltage is applied thereto to push the bobbin in one direction along the first axis; a second piezoelectric element disposed on the body and lengthened when a voltage is applied thereto to push the bobbin in the other direction along the first axis; and an upper cover that is coupled to an upper portion of the body and has a through-hole, through which the bobbin passes and communicates with the through-hole of the body, wherein the bobbin can be positioned as desired along the first axis by adjusting the voltages applied to the first piezoelectric element and the second piezoelectric element. Accordingly, the emission tip can be exactly and stably positioned using only the movable piezoelectric elements.

11 Claims, 7 Drawing Sheets

U.S. PATENT DOCUMENTS

| | | | | |
|---|---|---|---|---|
| 4,908,519 | A | * | 3/1990 | Park et al. .................. 250/306 |
| 4,920,660 | A | * | 5/1990 | Nagasawa et al. ............. 33/568 |
| 4,925,139 | A | * | 5/1990 | McCord ................. 248/176.3 |
| 5,095,725 | A | * | 3/1992 | Wada et al. ................ 72/31.13 |
| 5,406,833 | A | * | 4/1995 | Yamamoto .................. 73/105 |
| 5,656,769 | A | * | 8/1997 | Nakano et al. ................ 73/105 |
| 5,786,654 | A | * | 7/1998 | Yoshida et al. .............. 310/328 |
| 5,847,383 | A | * | 12/1998 | Tong .......................... 250/234 |
| 5,847,488 | A | * | 12/1998 | Yoshida et al. .............. 310/328 |
| 5,854,487 | A | * | 12/1998 | Braunstein et al. ......... 250/306 |
| 6,023,060 | A | | 2/2000 | Chang et al. |
| 6,194,813 | B1 | * | 2/2001 | Israelachvili ............... 310/328 |
| 6,229,607 | B1 | * | 5/2001 | Shirai et al. ................ 356/614 |
| 6,612,160 | B2 | * | 9/2003 | Massie et al. ............... 250/234 |
| 6,617,761 | B2 | * | 9/2003 | Ando et al. ................ 310/328 |

FOREIGN PATENT DOCUMENTS

| | | | | |
|---|---|---|---|---|
| JP | 01-210672 | A | * | 8/1989 |
| JP | 04-132904 | A | * | 5/1992 |
| JP | 2000-298239 | | * | 10/2000 |
| KR | 1020010029736 | | | 4/2001 |

OTHER PUBLICATIONS

"Miniature three-axis micropositioner for scanning proximal probe and other applications", S. Kleindiek, J. Vac. Sci. Technol. B 13(6) Nov./Dec. 1995, 1995 American VAcuum Society, pp. 2653-2656.

* cited by examiner

FIG. 1

PRIOR ART

FIG. 2

PRIOR ART

MICRO STAGE USING PIEZOELECTRIC ELEMENT

BACKGROUND OF THE INVENTION

This application claims the priority of Korean Patent Application No. 10-2004-0107224, filed on Dec. 16, 2004, in the Korean Intellectual Property Office, the disclosure of which is incorporated herein in its entirety by reference.

1. Field of the Invention

The present invention relates to a micro stage, and more particularly, to a micro stage employed in a micro-column electron beam apparatus, which is mounted in an ultra high vacuum chamber and is capable of stably positioning an electron emission tip on an electron lens module without coupling effects.

2. Description of the Related Art

Efforts have been made world wide to miniaturize micro stages employed in micro-column electron beam apparatuses. The micro stages are applied to scanning tunneling microscopes, which align an emission tip, which is an electron beam source essential to all electron beam apparatuses, along an optical axis and operate the emission tip in a field emission mode.

Figure 1:
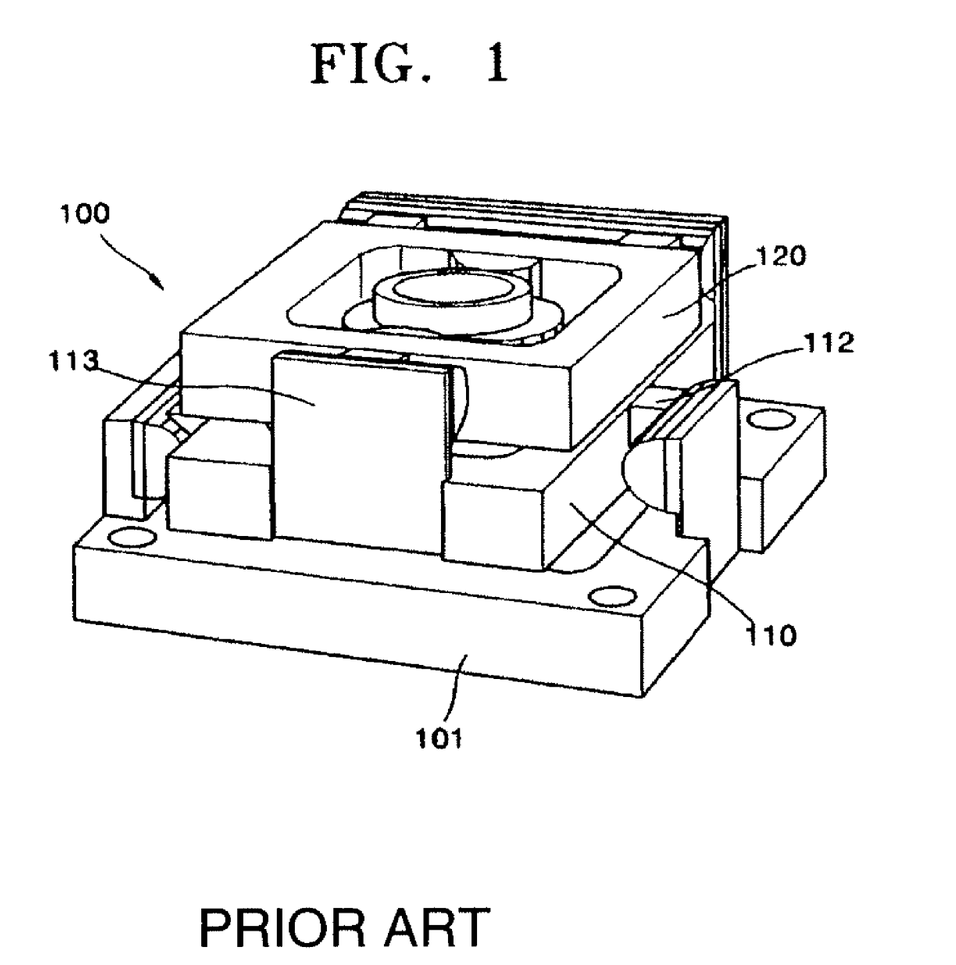
FIG. 1 is a perspective view of a conventional micro stage.
Figure 2:
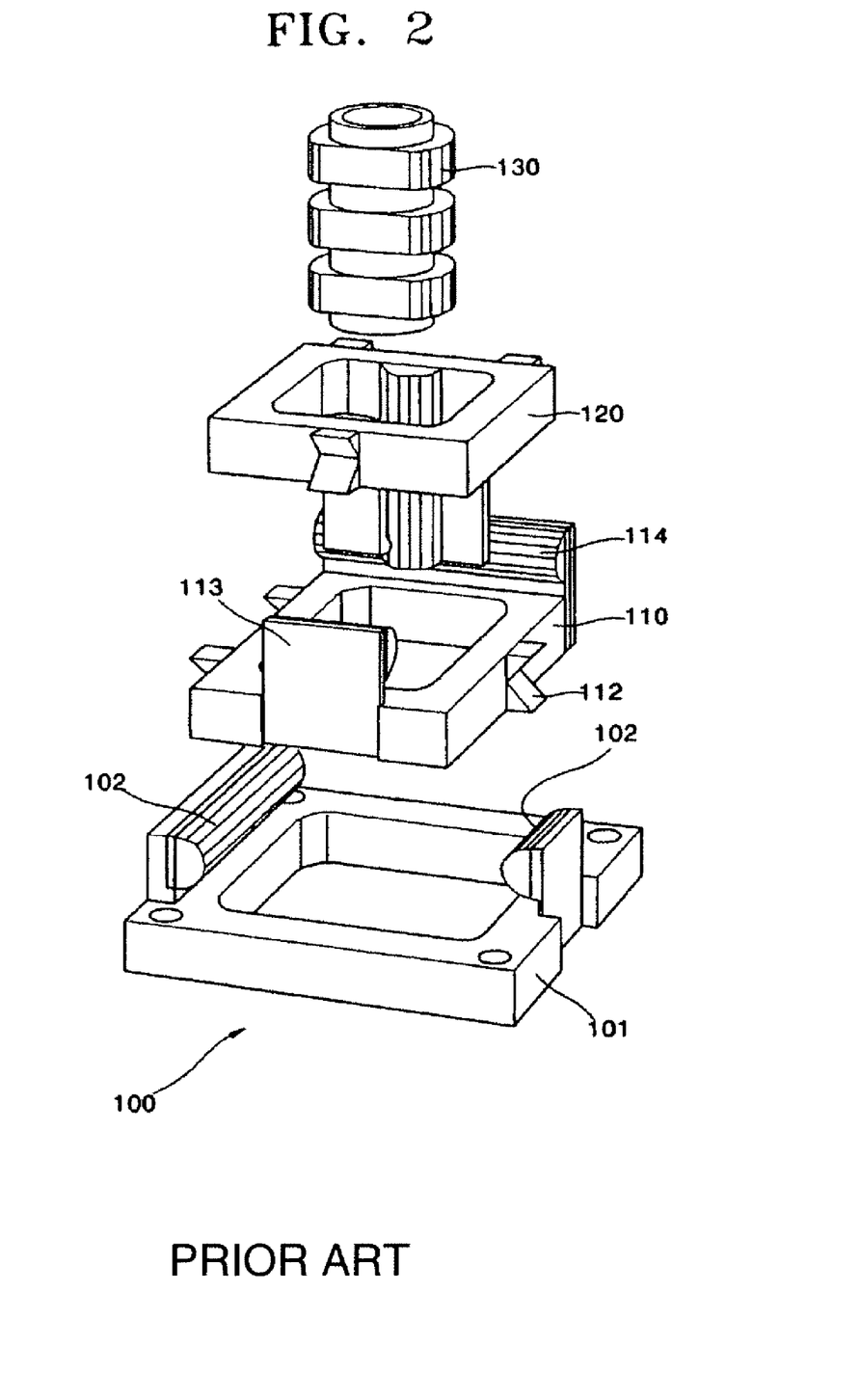
FIG. 2 is an exploded perspective view of the conventional micro stage of FIG. 1.

FIGS. 1 and 2 are respectively a perspective view and an exploded perspective view of a conventional micro stage employing piezoelectric elements that are used to move an electron beam source tip module along X, Y, and Z axes.

A stage module 100 employed in a conventional micro-column electron beam apparatus functions as a three-axis positioner. The stage module 100 includes four stainless steel stages, that is, a base frame 101, an Y-axis sliding state 110, an X-axis sliding state 120, and a Z-axis sliding state 130.

This structure is instrumentally complex and physically requires various additional functions, each causing operational problems. Also, slow motion of piezoelectric (PZT) actuators 102 results in friction between the stages, and fast motion of the PZT actuators 102 causes the stages to slip from their desired positions due to their inertia.

In general, each of the PZT actuators 102 moves the stages by approximately 10 μm when 100 V is applied to the PZT actuators 102. To make the moving stages slide, both a rigid bearing and smooth sliding surface should be used. Steel and sapphire, which have a smooth sliding surface, may be used for the smooth sliding bearing. A guide bearing which has V-grooves 112 of several millimeters may be disposed in the moving base frame 101 at an angle of 90 degrees. Ball sliding bearings may be placed in the V-grooves 112 to act as guiding bearings.

In the conventional stage module 100, a large force is applied to contact surfaces so that the V-grooves 112 over a half rod 114 can slide to press the contact surfaces and reduce friction generated at the contact surfaces. However, this structure has disadvantages of poor alignment of the V-grooves 112 when the V-grooves 112 are mechanically processed. In addition, as the contact surfaces increase, a pressure higher than the ball bearings is produced.

A leaf spring 113 is used for pressing the moving stages, not a coil spring. The leaf spring 113 is fairly stiff in a direction perpendicular to a direction in which it is flexible.

SUMMARY OF THE INVENTION

The present invention provides a micro stage on which piezoelectric elements can be simply mounted and which can stably position an emission tip using only the movable piezoelectric elements without coupling effects.

According to an aspect of the present invention, there is provided a micro stage comprising: a body having a vertically perforated through-hole passing through a central portion thereof; a bobbin including a tip portion with an electron emission tip embedded in the center thereof, and passing through the through-hole of the body to be moved in the through-hole along a first axis perpendicular to a vertical direction; a first piezoelectric element disposed on the body and lengthened when a voltage is applied thereto to push the bobbin in one direction along the first axis; a second piezoelectric element disposed on the body and lengthened when a voltage is applied thereto to push the bobbin in the other direction along the first axis; and an upper cover that is coupled to an upper portion of the body and has a through-hole, through which the bobbin passes and communicates with the through-hole of the body, wherein the bobbin can be positioned as desired along the first axis by adjusting the voltages applied to the first piezoelectric element and the second piezoelectric element.

When the voltage applied to the first and second piezoelectric elements is removed, the first and second piezoelectric elements may be shortened again to separate from the bobbin.

The bobbin may include a flange having a diameter greater than the diameter of the through-hole of the body, wherein the upper cover includes pressing means that presses the flange of the bobbin to limit the movement of the bobbin, such that the bobbin can be moved along the first axis by only the first piezoelectric element or the second piezoelectric element.

The pressing means may be a spring disposed under the upper cover.

The micro stage may further comprise: a first adjustment screw disposed outside the first piezoelectric element to adjust the position of the first piezoelectric element along the first axis; and a second adjustment screw disposed outside the piezoelectric element to adjust the position of the second piezoelectric element along the first axis.

The micro stage may further comprise: a third piezoelectric element disposed on the body and lengthened when a voltage is applied thereto to push the bobbin in one direction along a second axis that is perpendicular to both the vertical direction and the first axis; and a fourth piezoelectric element disposed on the body and lengthened when a voltage is applied thereto to push the bobbin in the other direction along the second axis, wherein the bobbin can be positioned as desired along the second axis by adjusting the voltage applied to the third piezoelectric element and the fourth piezoelectric element.

When the voltage applied to the third and fourth piezoelectric elements is removed, the third and fourth piezoelectric elements may be shortened again to separate from the bobbin.

The width of a surface of each of the first and second piezoelectric elements facing the bobbin may not be less than a maximum distance in which the bobbin can be moved along the second axis by the third or fourth piezoelectric element, the width of a surface of each of the third and fourth piezoelectric elements facing the bobbin may not be less than a maximum distance in which the bobbin can be moved along the first axis by the first or second piezoelectric element, the movement of the bobbin along the second axis due to the third and fourth piezoelectric elements may not be affected by the position of the bobbin along the first axis, and the movement of the bobbin along the first axis due to the first and second piezoelectric elements may not be affected by the position of the bobbin along the second axis.

The micro stage may further comprise: a first support protrusion that is disposed between the first axis and a first straight line parallel to the first axis and is closer to the first straight line; a first lever that contacts both the first piezoelectric element and the bobbin and rotates about the first support protrusion; a second support protrusion that is disposed between the first axis and a second straight line parallel to the first axis and is closer to the second straight line; and a second lever that contacts both the second piezoelectric element and the bobbin and rotates about the second support protrusion, wherein the first piezoelectric element is disposed along the first straight line and the second piezoelectric element is disposed along the second straight line, wherein, when the first piezoelectric element is lengthened and moved, the bobbin is moved a distance equal to the distance the first piezoelectric element is lengthened and moved times the ratio of the distance between the first axis and the first support protrusion to the distance between the first support protrusion and the first straight line, wherein, when the second piezoelectric element is lengthened and moved, the bobbin is moved a distance equal to the distance the second piezoelectric element is lengthened and moved times the ratio of the distance between the first axis and the second support protrusion to the distance between the second support protrusion to the distance between the second support protrusion and the second straight line.

The micro stage may further comprise: a third support protrusion that is disposed between the second axis and a third straight line parallel to the second axis and is closer to the third straight line; a third lever that contacts both the third piezoelectric element and the bobbin and rotates about the third support protrusion; a fourth support protrusion that is disposed between the second axis and a fourth straight line parallel to the second axis and is closer to the fourth straight line; and a fourth lever that contacts both the fourth piezoelectric element and the bobbin and rotates about the fourth support protrusion, wherein the third piezoelectric element is disposed along the third straight line, and the fourth piezoelectric element is disposed along the fourth straight line, wherein, when the third piezoelectric element is lengthened and moved, the bobbin is moved a distance equal to the distance the third piezoelectric element is lengthened and moved times the ratio of the distance between the second axis and the third support protrusion to the distance between the third support protrusion and the third straight line, wherein, when the fourth piezoelectric element is lengthened and moved, the bobbin is moved a distance equal to the distance the fourth piezoelectric element is lengthened and moved times the ratio of the distance between the second axis and the fourth support protrusion to the distance between the fourth support protrusion and the fourth straight line.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which preferred embodiments of the invention are shown.

Figure 3:
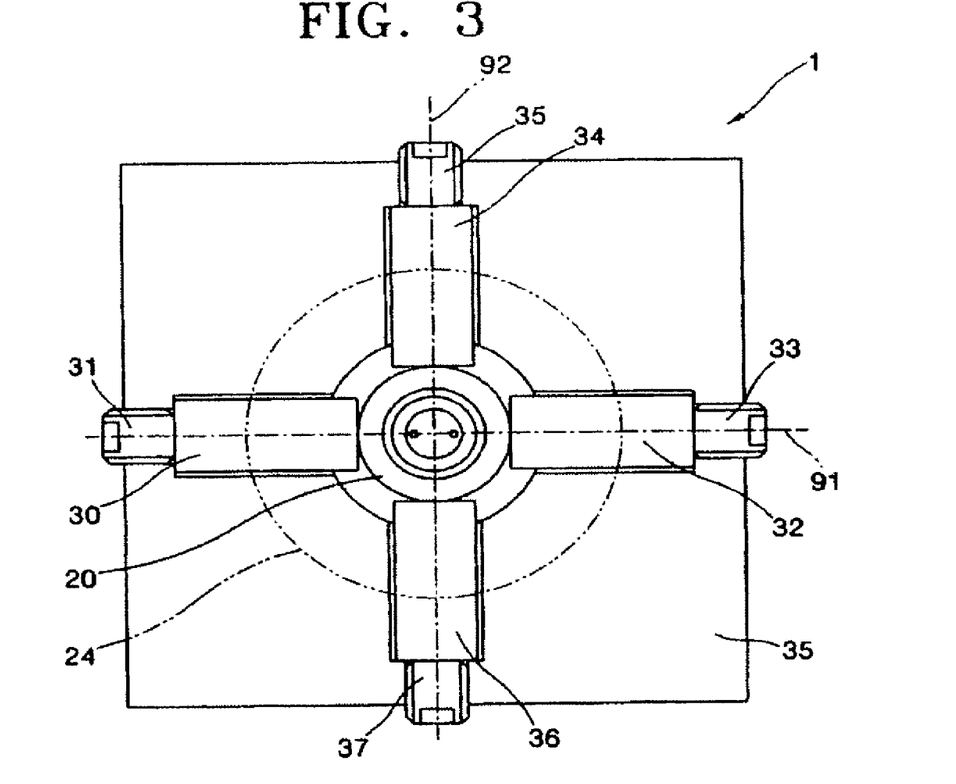
FIG. 3 is a plan view of a micro stage employing piezoelectric elements according to an embodiment of the present invention, in a state where an upper cover is removed and a flange of a bobbin is marked with a semi-dotted line.

FIG. 3 is a plan view of a micro stage employing piezoelectric elements according to an embodiment of the present invention. According to FIG. 3, the micro stage 1 includes a body 10, a bobbin 20, first, second, third, and fourth piezoelectric elements 30, 32, 34, and 36, and an upper cover 40.

The body 10 has a vertically perforated through-hole 12 passing through a central portion thereof. The body 10 may be made of stainless steel to be loaded in an ultra high vacuum. The through-hole 12 has a diameter large enough to form a space between the through-hole 12 and the bobbin 20 so that the bobbin 20 can be moved along first and second axes 91 and 92.

Figure 4:
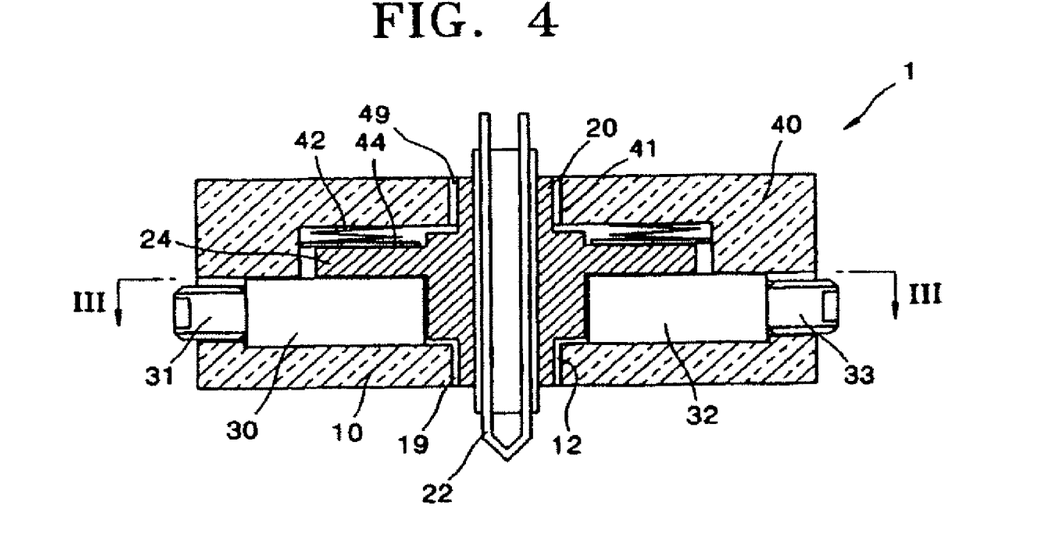
FIG. 4 is a cross-sectional view of the micro stage of FIG. 3.

FIG. 4 is a cross-sectional view of the micro stage of FIG. 3. Referring to FIG. 4, the bobbin 20 is inserted into the through-hole 12 of the body 10. The bobbin 20 includes a tip portion 22 with an electron emission tip and a flange 24 with a greater diameter. The tip portion 22 is disposed along the central axis of the bobbin 20 and the flange 24 is formed on an upper portion of the bobbin 20.

As though the tip portion 22 is not depicted, it is aligned at an appropriate position on an electron lens module (not shown) that comprises an electrostatic source lens module for extracting electrons from the emission tip and accelerating the electrons, an objective focus lens module for focusing a beam, and a single or double deflector module for diffracting the beam.

In the present embodiment, contact surfaces between the bobbin 20 and the body 10 are polished to a high finish so that the bobbin 20 can be precisely located at a desired position using only the piezoelectric elements 30, 32, 34, and 36, which are disposed on four sides of the bobbin 20.

The bobbin 20 is vertically placed in the through-hole 12. Since the tip portion 22 is fixed along the central axis of the bobbin 20, the tip portion 22 is moved together with the bobbin 20.

The bobbin 20 is coupled to the body 10 to be moved along the first axis 91 that is perpendicular to the vertical direction. Referring to FIG. 4, since the diameter of the bobbin 20 is slightly less than the diameter of the through-hole 12 of the body 10, the space 19 is formed between the outer surface of the bobbin 20 and the surface of the through-hole 12 of the body 10. The bobbin 20 can be moved along the first axis 91 in the space 19.

The flange 24 of the bobbin 20 is disposed over the through-hole 12 of the body 10 and has an outer diameter greater than the diameter of the through-hole 12. The flange 24 is marked by a ei-dotted line in FIG. 3. The flange 24 is under a pressure generated by a pressing means 42. Accordingly, a top surface of the flange 24 may have an area large enough to receive the pressure. The bobbin 20 can be moved only by the piezoelectric elements 30, 32, 34, and 36.

The first through fourth piezoelectric elements 30, 32, 34, and 36 are disposed on the body 10. Each of the piezoelectric elements 30, 32, 34, and 36 is lengthened with non-linear hysteresis characteristics as a voltage applied thereto is increased. The length of the piezoelectric element is increased by 10 μm at a maximum voltage of 100 V. For example, the length of the piezoelectric element is increased by 1 μm at a voltage of 10 V, 2 μm at a voltage of 20 V, and 3 μm at a voltage of 30 V. It is known that these piezoelectric elements are applied to micro stage technology and are used in an ultra high vacuum condition.

When a voltage is applied to the first piezoelectric element 30, the first piezoelectric element 30 is lengthened and moved to push the bobbin 20 in one direction (rightward in FIG. 3) along the first axis 91. If the voltage applied to the first piezoelectric element 30 is removed, the first piezoelectric element 30 is shortened and separates from the bobbin 20. In the present embodiment, when a voltage is applied to the piezoelectric elements, the piezoelectric elements come in contact with the bobbin 20 to push the bobbin 20 to a desired position, and when the voltage applied to the piezoelectric elements is removed, the piezoelectric elements separate from the bobbin 20. Therefore, unstable noise possibly generated by the voltage applied to the piezoelectric elements barely affects the movement of the bobbin 20.

A first adjustment screw 31 is disposed outside the first piezoelectric element 30 to adjust the position of the first piezoelectric element 30 along the first axis 91. The first adjustment screw 31 is used to determine the initial position of the first piezoelectric element 30. That is, the first adjustment screw 31 is used to adjust an initial distance between the first piezoelectric element 30 and the bobbin 20.

The second piezoelectric element 32 pushes the bobbin 20 in the opposite direction (leftward in FIG. 3) along the first axis 91. The second piezoelectric element 32 and the first piezoelectric element 30 are symmetric with respect to the bobbin 20. A second adjustment screw 33 is disposed on one side of the second piezoelectric element 32.

Since the operations of the second piezoelectric element 32 and the second adjustment screw 33 are the same as those of the first piezoelectric element 30 and the first adjustment screw 31, an explanation thereof will not be given.

In the present embodiment, the third and fourth piezoelectric elements 34 and 36 move the bobbin 20 along a second axis 92 perpendicular to the first axis 91 and the vertical direction in which the bobbin 20 is disposed.

The third piezoelectric element 34 is disposed on the body 10. When a voltage is applied to the third piezoelectric element 34, the third piezoelectric element 34 is lengthened and moved to push the bobbin 20 in one direction (downward in FIG. 3) along the second axis 92. The fourth piezoelectric element 36 can push the bobbin 20 in the other direction (upward in FIG. 3) along the second axis 92. When the voltage applied to the third and fourth piezoelectric elements 34 and 36 is removed, the third and fourth piezoelectric elements 34 and 36 are shortened again and separate from the bobbin 20. Accordingly, the bobbin 20 can be located at a desired position along the second axis 92 by adjusting the voltages applied to the third piezoelectric element 34 and the fourth piezoelectric element 36.

A third adjustment screw 35 and a fourth adjustment screw 37 are respectively disposed outside the third piezoelectric element 34 and the fourth piezoelectric element 36.

The width of a surface of each of the first and second piezoelectric elements 30 and 32 facing the bobbin 20 is not less than a maximum distance which the bobbin 20 can be moved along the second axis 92 by the third piezoelectric element 34 or the fourth piezoelectric element 36. The width of a surface of each of the third and fourth piezoelectric elements 34 and 36 facing the bobbin 20 is not less than a maximum distance which the bobbin 20 can be moved along the first axis 91 by the first piezoelectric element 30 or the second piezoelectric element 32. Accordingly, the movement of the bobbin 20 along the second axis 92 due to the third and fourth piezoelectric elements 34 and 36 is not affected by the position of the bobbin 20 along the first axis 91, and the movement of the bobbin 20 along the first axis 91 due to the first and second piezoelectric elements 30 and 32 is not affected by the position of the bobbin 20 along the second axis 92.

Figure 5:
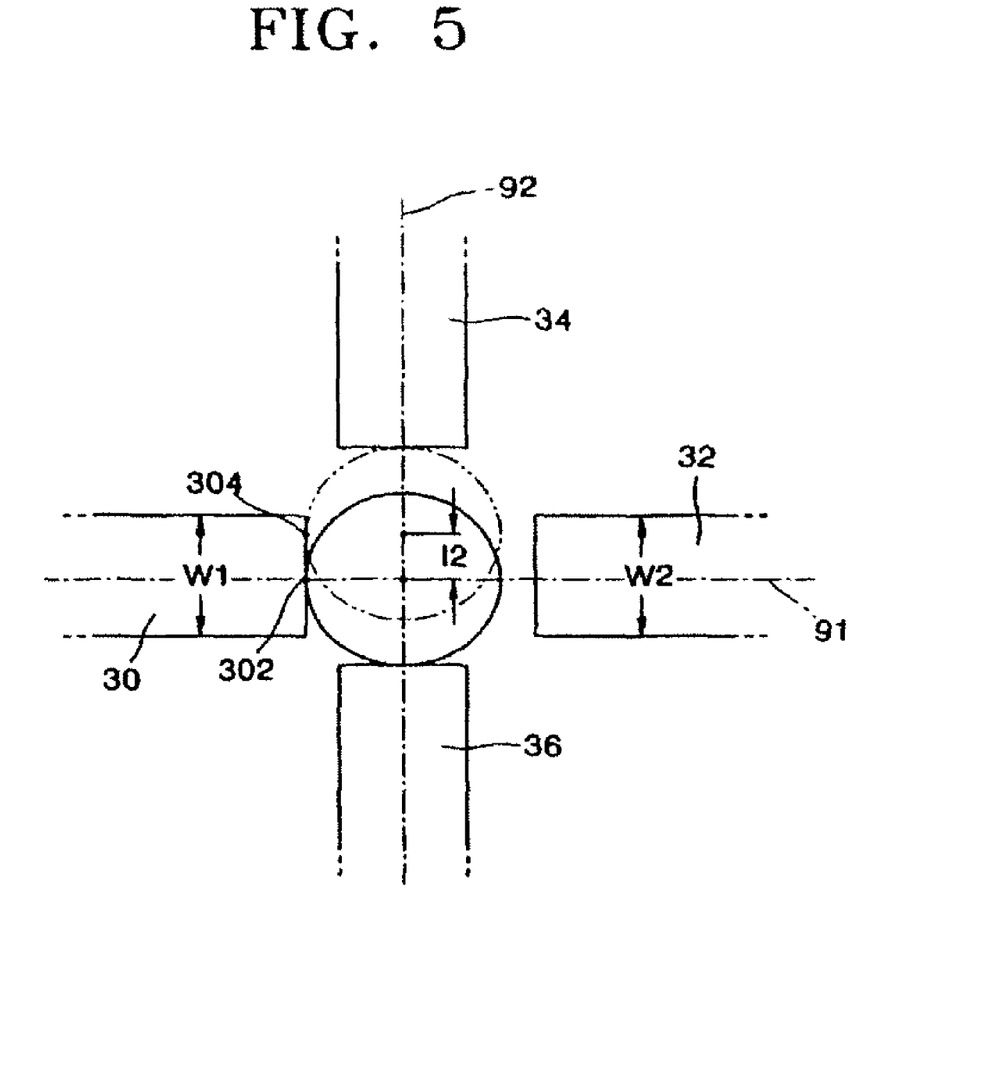
FIG. 5 is a view for explaining conditions for the width of each piezoelectric element of the micro stage of FIG. 3.

FIG. 5 is a view for explaining conditions for the width of each piezoelectric element of the micro stage of FIG. 3. Referring to FIG. 5, the width W1 of the first piezoelectric element 30 facing the bobbin 20 and the width W2 of the second piezoelectric element 32 are not less than a maximum distance 12 which the bobbin 20 can be moved along the second axis 92 by the third piezoelectric element 34 or the fourth piezoelectric element 36. In the present embodiment, since the maximum distance 12 which the bobbin 20 can be moved along the second axis is set to 10 μm, each of the widths W1 and W2 is equal to or greater than 10 μm. Referring to FIG. 5, even though the bobbin 20 is moved in the maximum distance 12 by the third and fourth piezoelectric elements 34 and 36, since the width W1 of the first piezoelectric element 30 is greater than the maximum distance 12, the first piezoelectric element 30 can contact the bobbin 20 at a certain position between two contact points 302 and 304. Consequently, regardless of the position of the bobbin 20 along the second axis 92, the first piezoelectric element 30 can push the bobbin 20 to a desired position along the first axis 91. The same applies to the motion of the bobbin 20 along the second axis.

The upper cover 40 has a through-hole 41 communicating with the through-hole 12 of the body 10, and the bobbin 20 passes through the through-hole 41 of the upper cover 40. The through-hole 41 has a sufficient diameter to form a space 49 between the upper cover 40 and the bobbin 20 so that the bobbin 20 can be moved along the first and second axes 91 and 92. The upper cover 40 is coupled to an upper portion of the body 10.

The upper cover 40 includes the pressing means 42 that presses the flange 24 of the bobbin 20 to limit the movement of the bobbin 20.

The pressing means 42 presses the bobbin 20 so that the bobbin 20 can be pushed along the first axis 91 or the second axis 92 by the first, second, third, and fourth piezoelectric elements 30, 32, 34, and 36. That is, when the tip portion 22 embedded in the bobbin 20 is aligned, the pressing means 42 presses the bobbin 20 so that the bobbin 20 can be pushed by the piezoelectric elements 30, 32, 34, and 34 but not by unexpected external forces, such as those resulting from vibrations. At this time, the pushing force produced by the piezoelectric elements 30, 32, 34, and 36 should be greater than the sliding friction between the bobbin 20 and the body 10.

In the present embodiment, the pressing means is a spring 42 disposed under the upper cover 40. Further, a pressure plate 44 may be used with the spring 42. That is, the pressure plate 44 may be disposed between the spring 42 and the bobbin 20 to uniformly distribute the force from the spring 42 to the bobbin 20.

A method of positioning the bobbin 20 at a desired position along the first axis 91 using the first and second piezoelectric elements 30 and 32 will now be explained with references to FIGS. 6A through 6F. In detail, a method of positioning the bobbin 20 2 μm left off the center will be explained.

Figure 6A:
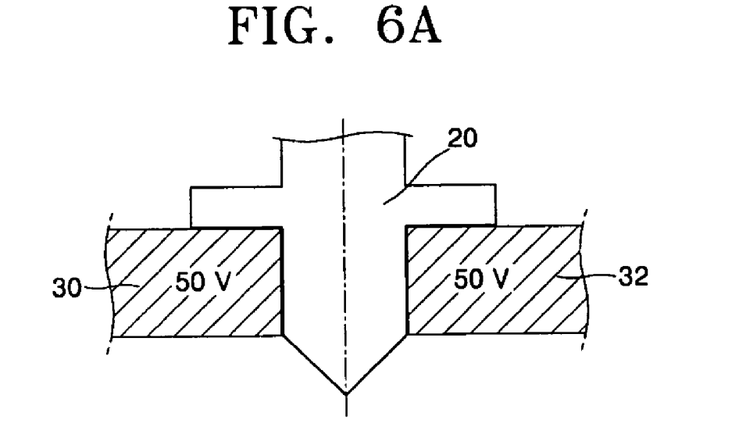
FIGS. 6A through 6F are views for explaining the movement of a bobbin according to change in voltage applied to two piezoelectric elements in the micro stage of FIG. 3.

Referring to FIG. 6A, the bobbin 20 is disposed virtually, along a central axis and 50 V is applied to each of the first piezoelectric element 30 and the second piezoelectric element 32. Each of the piezoelectric elements 30, 32, 34, and 36 is moved 10 µm at a voltage of 100 V. At this time, the positions of the first and second piezoelectric elements 30 and 32 are controlled by the first and second adjustment screws 31 and 33 so that no space exists between the bobbin 20 and the first and second piezoelectric elements 32 and 34.

Figure 6B:
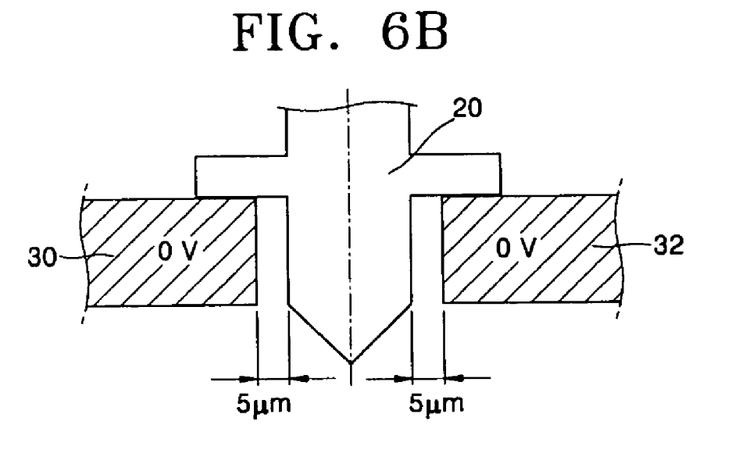

Referring to FIG. 6B, the voltage applied to the first and second piezoelectric elements 30 and 32 is removed. Then, a space of 5 µm is formed between the bobbin 20 and each of the first and second piezoelectric elements 30 and 32.

Although not shown in FIGS. 6A through 6F, the bobbin 20 is pressed downwardly by the pressure plate 44 and the spring 42 constituting the pressing means, thereby producing friction between the bobbin 20, the pressure plate 44, and the body 10. As a result, the bobbin 20 is moved only by the piezoelectric elements 30 and 32. That is, the force exerted by the piezoelectric elements 30 and 32 to push the bobbin 20 is greater than the friction generated by the contact surfaces between the bobbin 20, the body 10 and the pressure plate 44 of the upper cover 40.

Figure 6C:
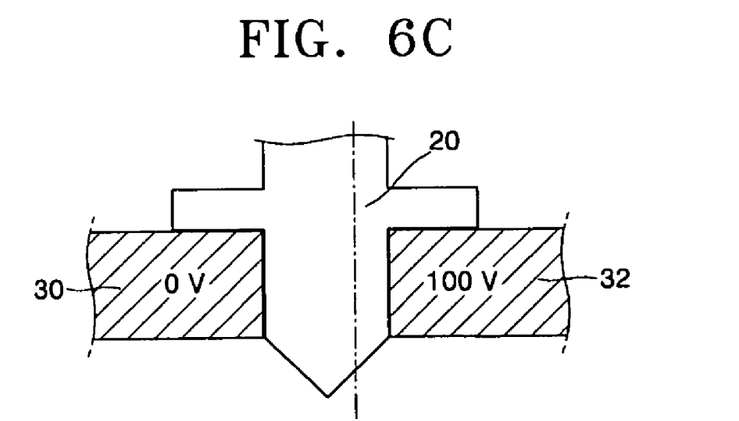

Referring to FIG. 6C, a voltage of 100 V is applied to the second piezoelectric element 32. Then, the bobbin 20 is moved to the left 5 µm.

Figure 6D:
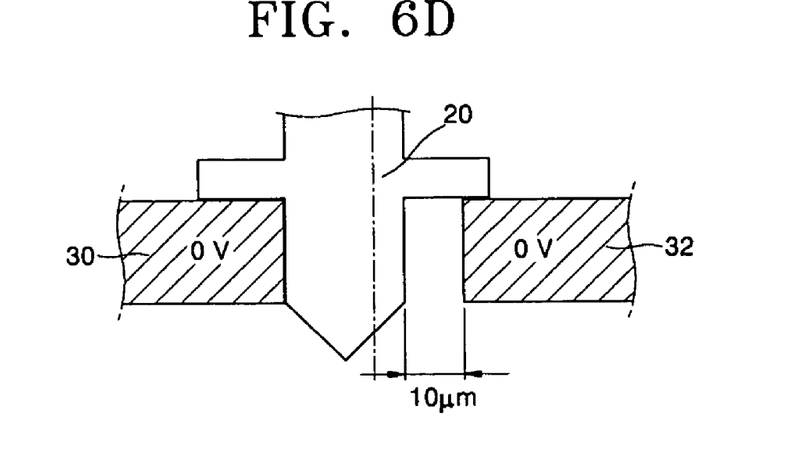
Figure 6E:
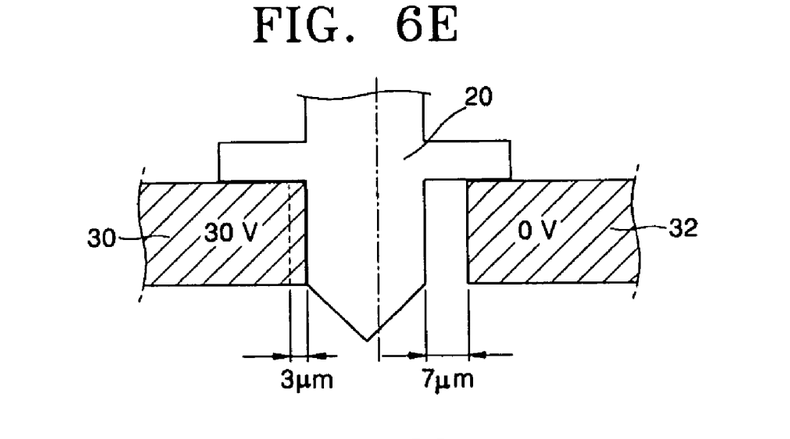
Figure 6F:
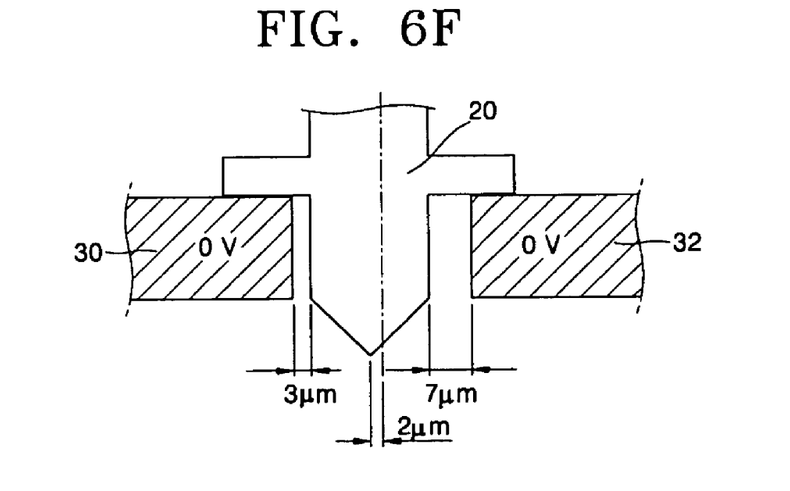

Referring to FIG. 6D, the voltage applied to the second piezoelectric element 32 is removed again. A distance of 10 µm is then formed between the bobbin 20 and the second piezoelectric element 32. Referring to FIG. 6E, a voltage of 30 V is applied to the first piezoelectric element 30 to push the bobbin 20 to the right by 3 µm. Referring to FIG. 6F, the voltage applied to the first piezoelectric element 30 is removed. As a result, the bobbin 20 separates 3 µm from the first piezoelectric element 30 and 7 µm from the second piezoelectric element 32, and is located 2 µm to the left from the central axis. When the bobbin 20 is located at the desired position, the voltage applied to the first and second piezoelectric elements 30 and 32 is removed, thereby preventing voltage instability. Also, since the bobbin 20 is fixed by the pressing means, the bobbin 20 is not affected by external vibrations, and thus can be stably located at the desired position.

Figure 7:
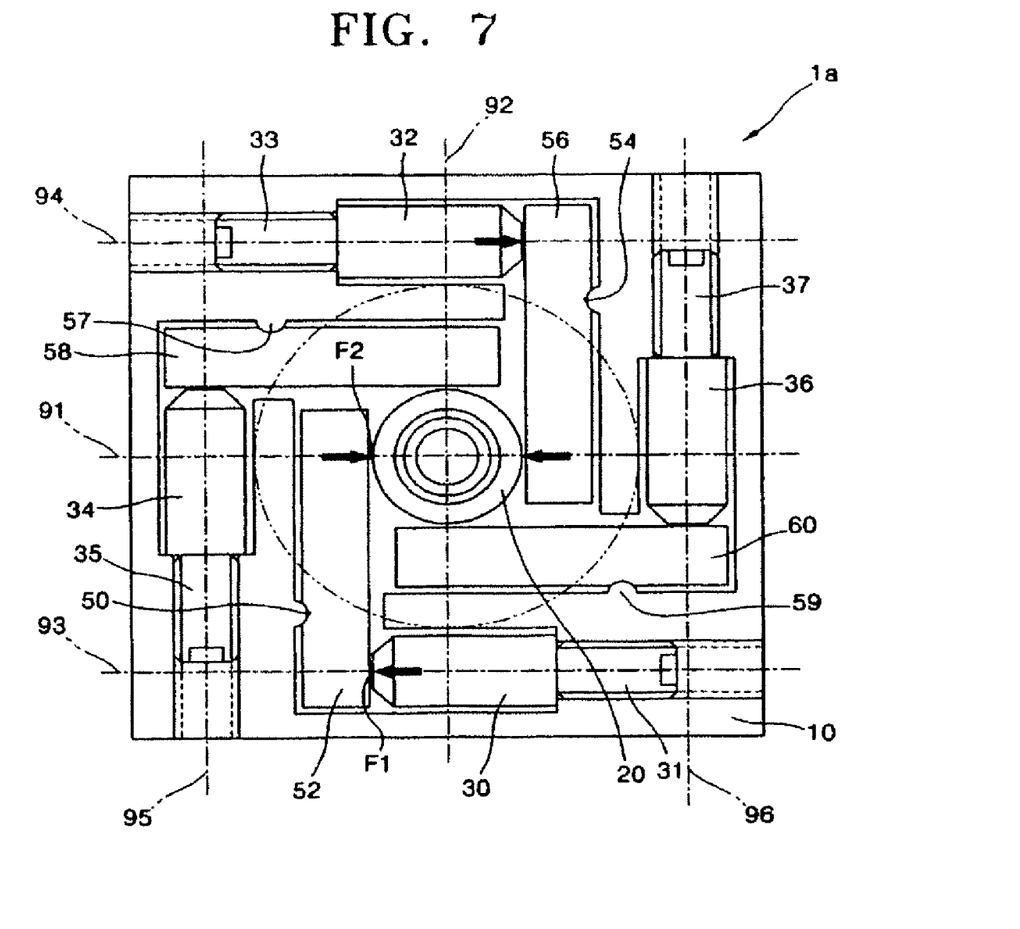
FIG. 7 is a plan view of a micro stage employing piezoelectric elements whose movement is increased by levers according to another embodiment of the present invention.

FIG. 7 is a plan view of a micro stage 1a using piezoelectric elements according to another embodiment of the present invention.

Only differences between the present embodiment illustrated in FIG. 7 and the previous embodiment illustrated in FIGS. 3 through 6 will now be explained. Like elements with the same or similar structures and operations have like reference numerals.

In this embodiment illustrated in FIG. 7, to increase the movement of the piezoelectric elements with respect to the bobbin, simple levers and support protrusions are additionally used. The entire size of the small micro stage is increased as little as possible by efficiently utilizing the inner space of the micro stage.

Referring to FIG. 7, the first piezoelectric element 30 is disposed along a first straight line 93 parallel to the first axis 91. A first support protrusion 50 is disposed between the first axis 91 and the first straight line 93 closer to the first straight line 93. A first lever 52 is contacted by both the first piezoelectric element 30 and the bobbin 20 and rotates about the first support protrusion 50. That is, when the first piezoelectric element 30 is lengthened and moved, it moves one end of the first lever 52 and the other end of the first lever 52 pushes the bobbin 20.

With this structure, when the first piezoelectric element 30 is lengthened and moved, the bobbin 20 is moved rightward in FIG. 7 by the first lever 52 rotating about the first support protrusion 50. Here, the distance the bobbin 20 is moved is equal to the distance the first piezoelectric element 30 is moved times the ratio of the distance between the first axis 91 and the first support protrusion 50 to the distance between the first support protrusion 50 and the first straight line 93.

A point F1 where a force is applied and an application point F2 are marked by arrows in FIG. 7. When the voltage applied to the first piezoelectric element 30 is removed, the first piezoelectric element 30 is shortened again, and the force exerted by the first lever 52 on the bobbin 20 is removed. A structure for separating the first lever 52 from the bobbin 20 may be additionally adopted.

This mechanism is also used for the second, third, and fourth piezoelectric elements 32, 34, and 36.

That is, a second support protrusion 54 and a second lever 56 are disposed between the second piezoelectric element 32 and the bobbin 20, a third support protrusion 57 and a third lever 58 are disposed between the third piezoelectric element 34 and the bobbin 20, and a fourth support protrusion 59 and a fourth lever 60 are disposed between the fourth piezoelectric element 36 and the bobbin 20. Since the operation and effect of each of these is the same as above, further explanation will not be given.

The micro stage employing the piezoelectric elements is mounted in an ultra high vacuum chamber, and can exactly position the emission tip on an electron lens module that comprises an electrostatic source lens module for extracting electrons from the emission tip and accelerating the electrons, an objective focus lens module for focusing a beam, and a single or double deflector module for diffracting the beam.

In particular, since the piezoelectric elements are mounted and used as actuators, coupling effects do not occur when the piezoelectric elements are moved along the first axis and the second axis. Also, a highly stable alignment can be achieved using only the movable piezoelectric elements. After the bobbin is positioned as desired, since the voltage applied to the piezoelectric elements is removed and the bobbin is fixed only by the upper cover, the bobbin is not affected by voltage changes and vibrations. As a result, according to the present invention, the emission tip can be stably positioned and fixed.

Furthermore, if levers are additionally employed, the movement of the bobbin by the piezoelectric elements can be increased.

Without various concerns and problems of the conventional art, the emission tip can be stably aligned using only the movable piezoelectric elements with no coupling effects. Moreover, the tip can be stably positioned and fixed without being affected by voltage changes and vibrations. While voltages are applied to the piezoelectric elements that are to be moved, a voltage supply to other piezoelectric elements is cut off, thereby not interrupting the moving piezoelectric elements.

Since the width of contact surfaces between the bobbin and the piezoelectric elements is sufficiently large, the movement along one of the axes can be ensured regardless of the position of the bobbin along the other axis, thereby preventing non-linear movement problems due to coupling effects.

Accordingly, the micro stage of the present invention is suitable for miniaturized micro-column electron beam apparatuses used world-wide.

Although the bobbin 20 can be moved along the first axis and the second axis in the aforesaid embodiments, the present invention is not limited thereto, and the bobbin 20 may be able to be moved along only one of the first and second axes. That is, the bobbin 20 may be moved along a straight line on a single axis, not on a plane having two axes. In this case, the third and fourth piezoelectric elements are not employed.

Although the spring is used as the pressing means in the embodiments described herein, the present invention is not limited thereto, and any one pressing means can be used if it can limit the movement of the bobbin 20 so that the bobbin 20 can be moved only by the piezoelectric elements.

Although the two-dimensional movement of the bobbin 20 is limited in the aforementioned embodiments, a similar structure can be used to limit the vertical movement of the bobbin.

As described above, the micro stage employing the piezoelectric elements of the present invention can exactly and stably align the emission tip by moving the piezoelectric elements.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A micro stage comprising:
    a body having a vertically perforated through-hole passing through a central portion thereof;
    a bobbin including a tip portion of the bobbin at one end of the bobbin with an electron emission tip embedded in a center thereof, and passing through the through-hole of the body to be moved in the through-hole along a first axis perpendicular to a vertical direction wherein the bobbin includes a flange having a diameter greater than a diameter of the through-hole of the body;
    a first piezoelectric element disposed on the body and to be lengthened when a voltage is applied thereto to push the bobbin in one direction along the first axis;
    a second piezoelectric element disposed on the body and to be lengthened when a voltage is applied thereto to push the bobbin in another direction along the first axis; and
    an upper cover that is coupled to an upper portion of the body and that has a through-hole, through which the bobbin passes and communicates with the through-hole of the body wherein the upper cover includes pressing means that presses the flange of the bobbin to limit movement of the bobbin, such that the bobbin is to be moved along the first axis by only the first piezoelectric element and the second piezoelectric element,
    wherein the bobbin is to be positioned along the first axis by adjusting the voltages applied to the first piezoelectric element and the second piezoelectric element,
    wherein, when the voltages applied to the first and second piezoelectric elements are removed, the first and second piezoelectric elements are shortened again to separate from the bobbin so that movement of the bobbin due to unstable noise generated by the voltage applied to the piezoelectric elements is reduced.

2. The micro stage of claim 1, wherein the pressing means comprises a spring disposed under the upper cover.

3. The micro stage of claim 1, further comprising:
    a first adjustment screw disposed outside the first piezoelectric element to adjust a position of the first piezoelectric element along the first axis; and
    a second adjustment screw disposed outside the piezoelectric element to adjust a position of the second piezoelectric element along the first axis.

4. The micro stage of claim 1, further comprising:
    a third piezoelectric element disposed on the body and to be lengthened when a voltage is applied thereto to push the bobbin in one direction along a second axis that is perpendicular to both the vertical direction and the first axis; and
    a fourth piezoelectric element disposed on the body and to be lengthened when a voltage is applied thereto to push the bobbin in another direction along the second axis,
    wherein the bobbin is to be positioned along the second axis by adjusting the voltages applied to the third piezoelectric element and the fourth piezoelectric element.

5. The micro stage of claim 4, wherein, when the voltages applied to the third and fourth piezoelectric elements is removed, the third and fourth piezoelectric elements are shortened again to separate from the bobbin.

6. The micro stage of claim 4, wherein a width of a surface of each of the first and second piezoelectric elements facing the bobbin is not less than a maximum distance in which the bobbin is to be moved along the second axis by the third piezoelectric element or the fourth piezoelectric element, a width of a surface of each of the third and fourth piezoelectric elements facing the bobbin is not less than a maximum distance in which the bobbin is to be moved along the first axis by the first piezoelectric element or the second piezoelectric element, the movement of the bobbin along the second axis due to the third and fourth piezoelectric elements is not affected by the position of the bobbin along the first axis, and the movement of the bobbin along the first axis due to the first and second piezoelectric elements is not affected by the position of the bobbin along the second axis.

7. The micro stage of claim 1, further comprising:
    a first support protrusion that is disposed between the first axis and a first straight line parallel to the first axis and where the first support protrusion is closer to the first straight line than to the first axis;
    a first lever to contact both the first piezoelectric element and the bobbin and to rotate about the first support protrusion;
    second support protrusion that is disposed between the first axis and a second straight line parallel to the first axis and where the second support protrusion is closer to the second straight line than to the first axis; and
    a second lever to contact both the second piezoelectric element and the bobbin and to rotate about the second support protrusion,
    wherein the first piezoelectric element is disposed along the first straight line and the second piezoelectric element is disposed along the second straight line,
    wherein, when the first piezoelectric element is lengthened and moved, the bobbin is moved a distance equal to the distance the first piezoelectric element is lengthened and moved times a ratio of a distance between the first axis and the first support protrusion to a distance between the first support protrusion and the first straight line,
    wherein, when the second piezoelectric element is lengthened and moved, the bobbin is moved a distance equal to the distance the second piezoelectric element is lengthened and moved times a ratio of a distance between the first axis and the second support protrusion to a distance between the second support protrusion to a distance between the second support protrusion and the second straight line.

8. The micro stage of claim 4, further comprising:
    a third support protrusion that is disposed between the second axis and a third straight line parallel to the second axis and where the third support protrusion is closer to the third straight line than to the second axis;

a third lever to contact both the third piezoelectric element and the bobbin and to rotate about the third support protrusion;

a fourth support protrusion that is disposed between the second axis and a fourth straight line parallel to the second axis and where the fourth support protrusion is closer to the fourth straight line than to the second axis; and a fourth lever to contact both the fourth piezoelectric element and the bobbin and to rotate about the fourth support protrusion, wherein the third piezoelectric element is disposed along the third straight line, and the fourth piezoelectric element is disposed along the fourth straight line, wherein, when the third piezoelectric element is lengthened and moved, the bobbin is moved a distance equal to a distance the third piezoelectric element is lengthened and moved times a ratio of a distance between the second axis and the third support protrusion to a distance between the third support protrusion and the third straight line, wherein, when the fourth piezoelectric element is lengthened and moved, the bobbin is moved a distance equal to a distance the fourth piezoelectric element is lengthened and moved times a ratio of a distance between the second axis and the fourth support protrusion to a distance between the fourth support protrusion and the fourth straight line.

9. The micro stage of claim 1, wherein the first piezoelectric element is in contact with the bobbin.

10. The micro stage of claim 1, wherein the bobbin is to be moved in the through-hole in a space between an outer surface of the bobbin and a surface of the through-hole.

11. The micro stage of claim 1, further comprising a third piezoelectric element and a fourth piezoelectric element, wherein all four piezoelectric elements are used to push the bobbin in a different direction.

* * * * *